United States Patent Office 2,766,279
Patented Oct. 9, 1956

2,766,279

PROCESS OF CHLORINATING CRESOXYACETIC ACID

John W. Jenney, North Madison, Ohio, assignor to Diamond Alkali Company, Cleveland, Ohio, a corporation of Delaware No Drawing. Application May 4, 1954,
Serial No. 427,645

11 Claims. (Cl. 260—521)

This invention relates to improvements in the manufacture of organic compounds, and more particularly relates to the manufacture of chlorinated cresoxyacetic acid. The expression "chlorinated cresoxyacetic acid," as used in the specification and claims, unless otherwise indicated, is intended to include functional derivatives of that acid, including esters, amides, and salts thereof.

Chlorinated cresoxyacetic acid, particularly 2-methyl-4-chlorophenoxyacetic acid, is a known effective hormone-type weed killer having general herbicidal properties. The material is preferred, in some instances, over 2,4-dichlorophenoxyacetic acid (2,4-D), particularly in those applications for cereal crops grown in relatively cool climates. The particular effectiveness arises both from the toxicity of 2-methyl-4-chlorophenoxyacetic acid against undesired weeds, such as Canada thistle, whitetop, and certain species of the mustard family, as well as high toleration by cereal crops to the use of the material, such as crops including flax, oats, wheat, barley, rye, and rice. Hence, the material is thoroughly established as a useful herbicidal composition and has gone into relatively wide use in formulations for application to such crops.

Various methods have heretofore been proposed for the manufacture of 2-methyl-4-chlorophenoxyacetic acid. For example, it has been proposed to chlorinate cresol and to condense the chlorinated product with monochloracetic acid to obtain 2-methyl-4-chlorophenoxyacetic acid. However, such a process produces a yield rarely in excess of 65% of desired product, the remaining portion being the 2-methyl-6-chloro isomer and other unwanted materials. Such materials, although apparently not unduly toxic to cereal crops and the like, to which the materials are applied, are useless as weed killers and therefore amount to inert diluents in the ultimate material. Hence, the wastage of upwards of 35% to 40% of the raw material employed renders such a process uneconomical.

In the case of the related 2,4-dichlorophenoxyacetic acid, it has been proposed to synthesize it by the condensation of phenol with monochloracetic acid, followed by dichlorination of the resultant condensation product. It has been proposed to accomplish this dichlorination by employing molten phenoxyacetic acid and chlorinating it under various conditions. This proposal has failed of adoption, primarily, since high temperatures of chlorination are required, and since losses of chlorine and a degradation of the phenoxyacetic acid are necessarily encountered. Moreover, upon chlorination of the phenoxyacetic acid, there is a considerable yield of undesired isomers which reduces the value of the ultimate product and, again, amounts to a wastage of raw material.

It has also been proposed, in connection with the manufacture of 2,4-dichlorophenoxyacetic acid, to condense phenol with monochloracetic acid and to follow this condensation reaction by dichlorination, in stepwise stages. This process, however, apparently is not adapted for commercial operation, since the best yield of the desired 2,4-dichlorophenoxyacetic acid product obtained is of the order of 80%.

The present invention has for its principal object the production of 2-methyl-4-chlorophenoxyacetic acid with substantially 100% active isomer in a high yield. The formula for this compound is

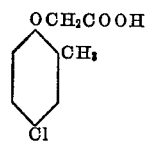

The present invention contemplates producing chlorinated cresoxyacetic acid by the chlorination of methyl phenoxyacetic acid in inert reaction media comprising a chlorinated aliphatic compound. The advantages obtained, although surprising, are substantial. Not only are excellent yields and high product quality obtained, but also the corrosion problem, heretofore encountered, is eliminated. Moreover, the chlorination solvent is readily recoverable in the practice of the present invention.

More particularly, the present invention contemplates the chlorination of methyl phenoxyacetic acid in a reaction medium consisting essentially of one or a mixture of chlorinated alkanes having a freezing point less than about 0° C. Preferred chlorinated alkanes exist as liquids, under atmospheric pressure, throughout the temperature range from approximately 0° C. to 150° C. and thus exist as liquids throughout the entire range of process temperatures.

Illustrative of suitable compounds are chlorinated methanes, such as carbon tetrachloride and chloroform; chlorinated ethanes, such as 1,1- or 1,2-dichloroethane, 1,1,1- or 1,1,2-trichloroethane, 1,1,2,2- or 1,1,1,2-tetrachloroethane and pentachloroethane; chlorinated propanes, such as 1- or 2-chloropropane, 1,1-, 1,2-, and 1,3-dichloropropane, 1,1,1-, 1,1,2-, or 1,2,3-, 1,1,3-, and 1,2,2-trichloropropane; chlorinated butanes, such as 1- or 2-chlorobutane, 1,1-, 1,2-, or 1,4-dichlorobutane and various chlorinated pentanes and hexanes. It will be understood, of course, that the present invention contemplates broadly the use of chlorinated alkanes as a chlorination solvent in the preparation of 2-methyl-4-chlorophenoxyacetic acid and is not to be limited necessarily to the particular chlorinated solvents herein described.

In many instances, superior results are obtained when the chlorination reaction of the present invention is conducted in the presence of a small amount of a metal halide, such as ferric chloride, or a halogen, such as iodine or bromine. In practice, it is preferred to employ a small amount of iodine as an inhibitor substantially to preclude any solvent chlorination.

While the quantity of reactants to be employed can, of course, be varied somewhat, depending on the particular conditions of reaction, it has been discovered that there is an optimum ratio of chlorine to methyl phenoxyacetic acid which, when established during the chlorination in a solvent of the present invention, provides an optimum yield of high purity product. More particularly, it has been found that when the molar ratio of chlorine to methyl phenoxyacetic acid is maintained within the range from 1.0:1.0 to 1.15:1.0 an optimum yield of desired product is obtained. It has also been found that within this range the preferred ratio of chlorine to methyl phenoxyacetic acid is 1.1:1.0.

Although the practice of the present invention contemplates chlorination in the absence of any catalyst or inhibitor, in many instances the use of a small amount of iodine or ferric chloride is desirable. Generally, iodine is the preferred solvent chlorination inhibitor because it is readily removed following the reaction, and also is easily inactivated with sodium thiosulfate in those instances where the filtrate is to be stored or where the solvent is to be distilled.

The reaction embodying the present invention generally comprises mixing methyl phenoxyacetic acid, preferably substantially water-free, and the inert solvent in a reaction vessel, adding thereto a small quantity of catalyst, such as ferric chloride or iodine, if desired, and thereafter introducing a sufficient amount of chlorine to insure complete reaction, a 5% to 10% excess over the theoretical quantity required being a typically practicable amount in accordance with the aforementioned optimum chlorine to methyl phenoxyacetic acid ratios. The chlorination reaction is exothermic and only when the chlorine concentration is low or as the reaction nears completion is it necessary to apply external heat.

The reaction mass is then cooled and filtered, the filtrate being recycled as inert solvent for use in subsequent chlorination operations, if desired. The filter cake, substantially pure chlorinated cresoxyacetic acid, is preferably washed with either the same or a different aliphatic compound, typically dichloroethane or trichloroethane, and is dried. Yields of better than 75% of chlorinated cresoxyacetic acid in high purity are obtained.

In order that those skilled in the art may better understand the present invention and the preferred methods by which the same may be carried into effect, the following specific examples are offered:

Example I

Into a 500 ml., 3-necked, round-bottomed flask equipped with a thermometer, a gas dispenser, and reflux condenser are introduced 150 gms. of 1,1,2-trichloroethane, 83 gms. of methyl phenoxyacetic acid, and 0.1 gm. of ferric chloride. The mixture is heated to 95° C., at which time 39.0 gms. of chlorine is gradually introduced. After approximately 20 gms. of chlorine is introduced, all of the methyl phenoxyacetic acid is in solution, the temperature at this point being 112° C. The heating of the solution is stopped and the temperature gradually drops to 102° C. during the introduction of the 39 gms. of chlorine.

The hot reaction mixture is then removed from the flask, cooled to 8° C., and the resultant crystals are collected on a vacuum filter. The filter cake is then slurried in 50 ml. of cold trichloroethane and again filtered. The crystals, after air-drying, weigh 79 gms. Ultraviolet analysis indicates that the product contains 98% 2-methyl-4-chlorophenoxyacetic acid.

Example II

Into a 500 ml., 3-necked, round-bottomed flask equipped with a thermometer, gas dispenser, and reflux condenser are introduced 200 gms. of 1,1,2-trichloroethane, 83 gms. of methyl phenoxyacetic acid, and 0.5 gm. of ferric chloride. The mixture is heated to reflux temperature of the trichloroethane and 39 gms. of chlorine introduced over a period of 45 minutes while the chlorination temperature is maintained between 70° and 100° C. After half of the chlorine is introduced all of the methyl phenoxyacetic acid is in solution.

The hot solution is filtered and cooled to 10° C. The resultant crystals are separated and washed with 25 cc. of cold ethylene dichloride and subsequently dried on a vacuum filter. The yield obtained is 76.2 gms. and analysis indicates that it contains 99% 2-methyl-4-chlorophenoxyacetic acid.

Example III

Into a 500 ml., 3-necked, round-bottomed flask equipped with a thermometer, gas dispenser, and reflux condenser are introduced 75 gms. of 1,2,3-trichloropropane, 83 gms. of methyl phenoxyacetic acid, and 0.1 gm. of ferric chloride. The mixture is heated to the reflux temperature of the solvent and 39 gms. of chlorine are gradually introduced over a period of 30 minutes while the temperature is maintained between 120° and 170° C.

The reaction mixture is then removed from the flask and cooled to 10° C., thereby precipitating a crystalline material. The crystals are separated by filtration and mixed with 50 gms. of 1,2-dichloropropane and ground in a mortar. The crystals are then collected by filtration and washed with an additional 25 gms. of 1,2-dichloropropane. The resultant product, after air-drying, weighs 78 gms., which is equivalent to an 80% yield and contains 91% 2-methyl-4-chlorophenoxyacetic acid.

While there have been described various embodiments of the invention, the methods described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of preparing 2-methyl-4-chlorophenoxyacetic acid comprising chlorinating cresoxyacetic acid in the presence of a chlorinated alkane and a substance selected from the group consisting of halogens and metal halides.

2. The method of preparing 2-methyl-4-chlorophenoxyacetic acid comprising chlorinating cresoxyacetic acid in the presence of a chlorinated alkane having a freezing point less than about 0° C. and a substance selected from the group consisting of halogens and metal halides.

3. The method according to claim 1 in which the alkane contains from 1 to 10 carbon atoms.

4. The method of preparing 2-methyl-4-chlorophenoxyacetic acid comprising chlorinating methyl phenoxyacetic acid in a solution of at least one chlorinated alkane existing as a liquid throughout the process temperature range, said solution also containing at least one substance selected from the group consisting of halogens and metal halides.

5. The method according to claim 2 in which the chlorination is also conducted in the presence of iodine.

6. The method according to claim 2 in which the chlorination is also conducted in the presence of ferric chloride.

7. The method according to claim 2 in which the total chlorine to cresoxyacetic acid ratio is within the range of about 1.0:1.0 to 1.15:1.0.

8. The method of preparing 2-methyl-4-chlorophenoxyacetic acid comprising passing chlorine into a mixture of cresoxyacetic acid, a substance selected from the group consisting of ferric chloride and iodine, and a chlorinated alkane, and subsequently recovering the desired chlorinated product.

9. The method of preparing 2-methyl-4-chlorophenoxyacetic acid comprising chlorinating cresoxyacetic acid in the presence of a substance selected from the group consisting of 1,2-dichloroethane, 1,1,2-trichloroethane, and 1,2,3-trichloropropane and a substance selected from the group consisting of halogens and metal halides.

10. The method of preparing 2-methyl-4-chlorophenoxyacetic acid comprising chlorinating cresoxyacetic acid in the presence of a chlorinated alkane and a halogen.

11. The method of preparing 2-methyl-4-chlorophenoxyacetic acid comprising chlorinating cresoxyacetic acid in the presence of a chlorinated alkane and a metal halide.

References Cited in the file of this patent

UNITED STATES PATENTS 2,437,527    Hester et al.    Mar. 9, 1948

OTHER REFERENCES

Haskelberg: J. Org. Chem., vol. 12, 426–33 (1947).